United States Patent [19]

Shinoda

[11] Patent Number: 4,868,486
[45] Date of Patent: Sep. 19, 1989

[54] AC POWER CONTROL APPARATUS
[75] Inventor: Takahisa Shinoda, Shizuoka, Japan
[73] Assignee: Koito Manufacturing Co., Ltd., Tokyo, Japan
[21] Appl. No.: 58,903
[22] Filed: Jun. 5, 1987
[30] Foreign Application Priority Data
   Jun. 6, 1986 [JP] Japan .................. 61-130261
[51] Int. Cl.$^4$ .............................. H02J 3/00
[52] U.S. Cl. ........................ 323/324; 323/238
[58] Field of Search ......... 323/235, 236, 238, 319, 323/321, 326, 901, 907, 324; 363/16; 361/3, 5, 6, 7

[56] References Cited

U.S. PATENT DOCUMENTS

| | | | |
|---|---|---|---|
| 3,363,143 | 1/1968 | Cavanaugh | 323/238 X |
| 3,702,941 | 11/1972 | Aiduck et al. | 361/7 |
| 4,287,465 | 9/1981 | Sherman | 323/319 X |
| 4,334,147 | 6/1982 | Payne | 323/238 X |
| 4,344,121 | 8/1982 | Weber | 363/16 |
| 4,600,877 | 7/1986 | Soderholm | 323/324 |
| 4,665,458 | 5/1987 | Matsuoka et al. | 323/297 X |

OTHER PUBLICATIONS

Peterson, IBM Technical Disclosure Bulletin, "Temperature Control Circuit", 10/65, pp. 808-809.

Primary Examiner—Peter S. Wong
Assistant Examiner—Kristin Peckman
Attorney, Agent, or Firm—Blakely, Sokoloff, Taylor & Zafman

[57] ABSTRACT

An AC power control apparatus including a power circuit for supplying an AC current to a load, and a circuit connected to a power supply, for initiating energization of the load at a zero-cross point of an AC current waveform. A control circuit for controlling the change of energization time between a current turn on time to a current turn off time in units of AC waveform cycles, and a detector for detecting an AC zero level. From a given polarity of the AC current waveform, the initiating energization of the load and deenergization of the load at a zero-cross point of the AC current waveform is from the same polarity as the given polarity of the AC current waveform.

10 Claims, 7 Drawing Sheets

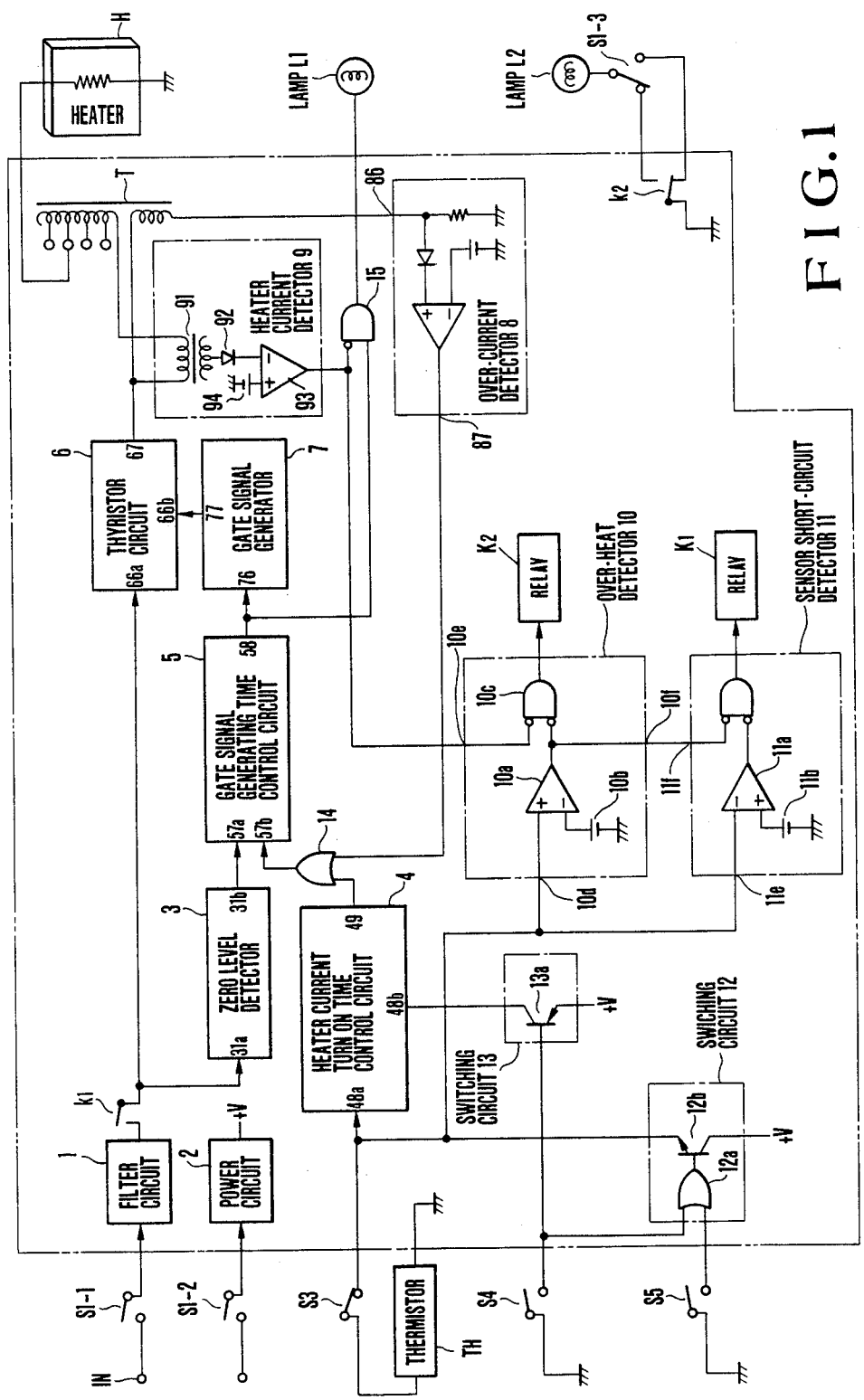
F I G. 1

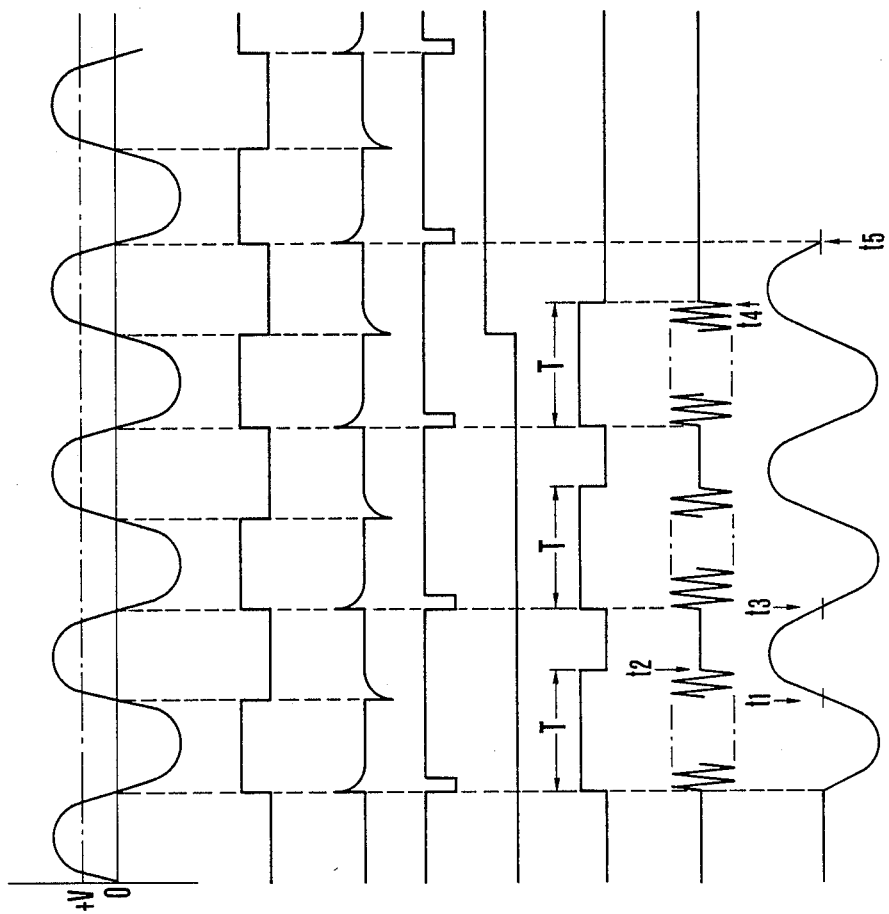

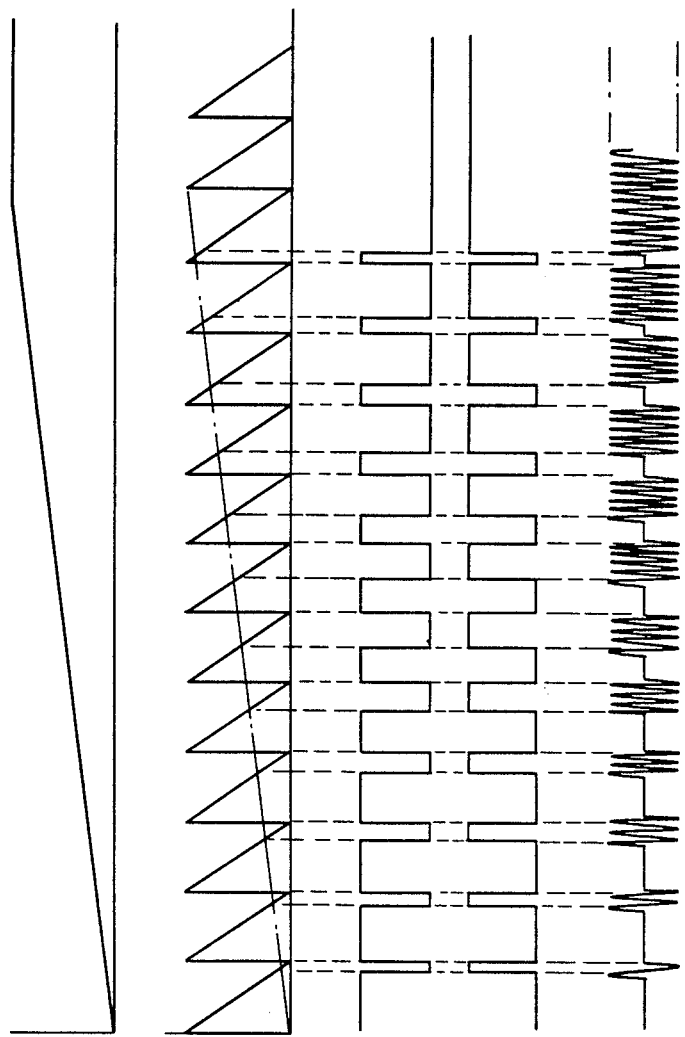

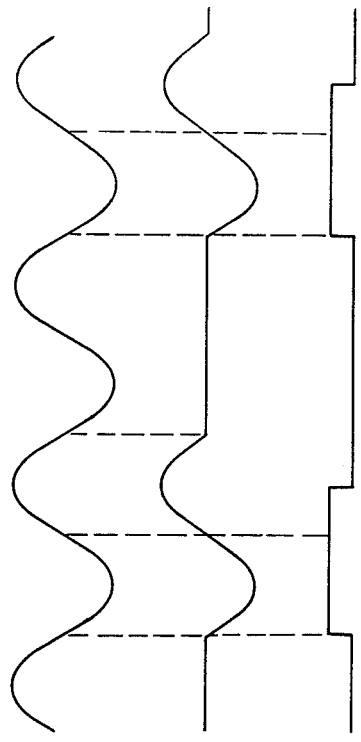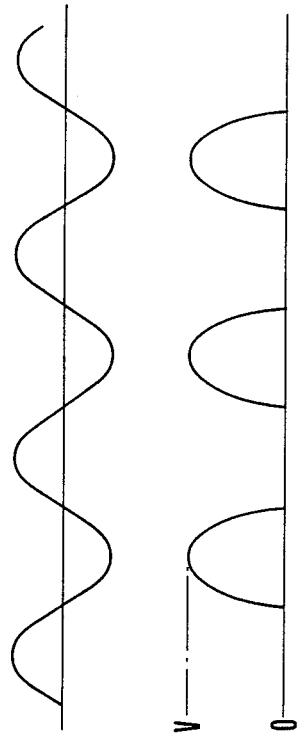
FIG.10A
FIG.10B
FIG.10C
FIG.11A
FIG.11B

AC POWER CONTROL APPARATUS

BACKGROUND OF THE INVENTION

The present invention relates to an AC power control apparatus and, more particularly, to an AC power control apparatus for heating a heater for a glass plate so as to prevent the glass plate from fogging and icing caused by a difference between room and atmospheric temperatures.

A heater is embedded in a windshield in front of a pilot seat in an airplane. A current is supplied to the heater and the heater is heated, thereby preventing the windshield from fogging and icing.

This current is supplied from an AC power source arranged inside the airplane. The value of the current must be adjusted depending on the atmospheric temperature, and thus phase control of the current is performed by a thyristor circuit in a conventional AC power control apparatus.

In a conventional AC power control apparatus, however, an AC waveform of the power source current is discontinuous and noise is undesirably generated. In order to eliminate noise, the current on/off operation may be performed at a zero level timing of the current.

In order to perform zero level control of the AC waveform, however, zero level detection must be performed. However, conventional zero level detection requires a complicated circuit, thus failing to satisfy economical requirements and circuit reliability.

Furthermore, when an over-current is supplied to the heater, the over-current is detected and controlled to be cut off from the heater.

In order to detect an AC over-current, however, an AC waveform must be rectified, the rectified signal must be amplified, and finally the level of the amplified signal must be detected. Therefore, the circuit arrangement is indispensably complicated, and DC amplification must be performed, thus causing circuit instability. In addition, an expensive circuit must be undesirably used.

When phase control of the AC current is performed by a thyristor circuit, an AC power source voltage is not matched with a rated voltage of the heater. For this reason, the power source voltage must be transformed to the rated voltage by a voltage transformer. In this case, if a heater current on/off interval is short, an apparatus using a voltage transformer must supply to a voltage transformer a voltage having a polarity opposite to that in the current cutoff state so as to prevent magnetic saturation of an iron core. In addition, in order to eliminate noise, the current is subjected to zero level control. However, since high stability of the power source frequency inside the airplane is not assured, it is difficult to generate a trigger signal to perform accurate current turn on or energization control.

SUMMARY OF THE INVENTION

It is an object of the present invention to eliminate the conventional drawbacks described above and to provide an AC power control apparatus wherein noise is not substantially adversely affected to other apparatuses, the turn on/off operation of the thyristor can be stabilized and properly performed, and a circuit arrangement can be simple at low cost.

An AC power control apparatus according to the present invention comprises power supply means for supplying an AC current to a load, means, connected to the power supply means, for initiating energization of the load at a zero-cross point of an AC current waveform from a given polarity and deenergization of the load at a zero-cross point of the AC current waveform from the same polarity as the given polarity of the AC power waveform, means for controlling to change an energization time between a current turn on time to a current turn off time in units of AC waveform cycles, and means for detecting an AC zero level.

BRIEF DESCRIPTION OF THE DRAWINGS

FIG. 1 is a block diagram of an AC power control apparatus according to an embodiment of the present invention;

FIGS. 8A to 8H are timing charts of signals generated in the apparatus of FIG. 1 so as to explain the operation thereof;

FIGS. 9A to 9E are timing charts for explaining the operation of the heater current turn on time control circuit;

FIGS. 10A to 10C are timing charts for explaining the current turn on or energization control operation; and FIGS. 11A and 11B are timing charts for explaining the operation of the over-current detector.

DESCRIPTION OF THE PREFERRED EMBODIMENT

Figure 2:
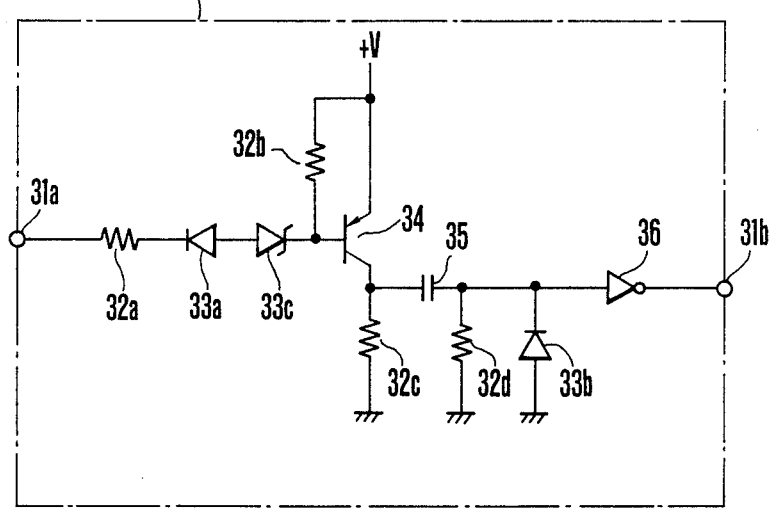
FIG. 2 a circuit diagram showing a detailed arrangement of a zero level detector shown in FIG. 1.

FIG. 1 is a block diagram showing an AC current control apparatus according to an embodiment of the present invention. Reference numeral 1 in FIG. 1 denotes a filter circuit; 2, a power circuit; 3, a zero level detector; 4, a heater current turn on time control circuit; 5, a gate signal generating time control circuit; 6, a thyristor circuit; 7, a gate signal generator; 8, an over-current detector; 9, a heater current detector; 10, an over-heat detector; 11, a sensor short-circuit detector; 12 and 13, switching circuits, respectively; 14, an OR gate; and 15, an AND gate. Reference symbols K1 and K2 in FIG. 1 denote relays, respectively; k1 and k2, contacts of the relays K1 and K2, respectively; T, a voltage transformer; S1-1 to S1-3, power switches which are interlocked with each other; S3, a sensor switch; S4, an over-heat check switch; S5, a power on check switch; H, a heater embedded in a windshield in front of a pilot seat; L1, an operation indicator lamp; L2, an over-heat indicator lamp; and TH, a thermistor for detecting a temperature of the windshield.

The filter circuit 1 is designed to prevent noise from entering into the apparatus and leaking therefrom. The power circuit 2 transforms an AC power source voltage into a DC voltage required for operation of the apparatus.

The zero level detector 3 detects a zero level for every period of the AC waveform and generates a pulse signal at the beginning of each period. As shown in FIG. 2, the zero level detector 3 comprises an input terminal 31a, an output terminal 31b, resistors 32a to 32d, diodes 33a to 33c, a transistor 34, a capacitor 35, and an inverter 36.

Figure 3:
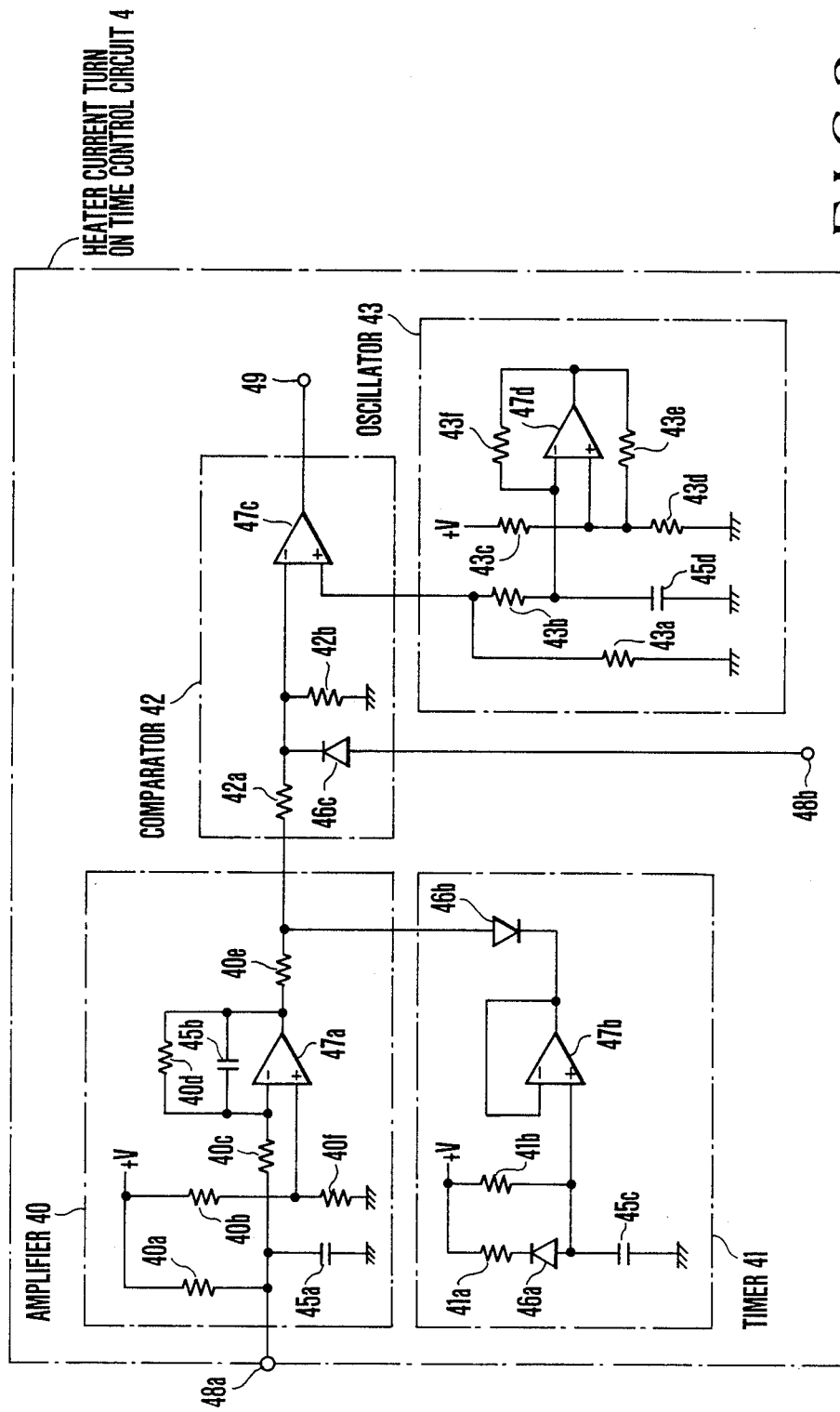
FIG. 3 a circuit diagram showing a detailed arrangement of a heater current turn on time control circuit shown in FIG. 1.

The heater current turn on time control circuit 4 controls the current turn on time of the current supplied to the heater H in units of AC waveform periods taken together with a windshield temperature and a lapse after energization of the heater. As shown in FIG. 3, the heater current turn on time control circuit 4 comprises an amplifier 40, a timer 41 whose output voltage is linearly increased for pb 3 minutes upon energization of the apparatus, a comparator 42, an oscillator 43 for generating a saw-toothed wave having a frequency of about 8 Hz. These components are actually composed of resistors 40a to 40f, 41a, 41b, 42a, 42b, 43a to 43f, capacitors 45a to 45d, diodes 46a to 46c, differential amplifiers 47a to 47d, input terminals 48a and 48b, and an output terminal 49.

Figure 4:
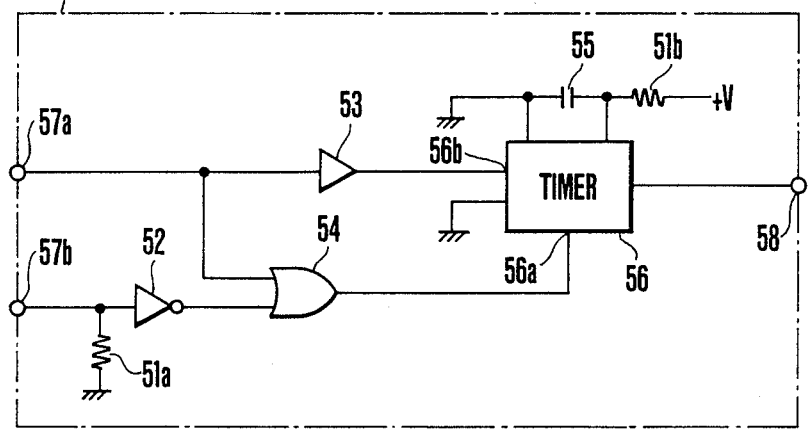
FIG. 4 a circuit diagram showing a detailed arrangement of a gate signal generating time control circuit shown in FIG. 1.

The gate signal generating time control circuit 5 generates gate signals for controlling the current turn on time or energization time of one period of the thyristor circuit 6. As shown in FIG. 4, the gate signal generating time control circuit 5 comprises resistors 51a and 51b, an inverter 52, a buffer 53, an OR gate 54, a capacitor 55, a timer 56, input terminals 57a and 57b, and an output terminal 58. When a signal supplied to the input terminal 57b is set at low level (to be referred to as logic "0" hereinafter), the gate signal generating time control circuit 5 generates an output signal having a pulse width shorter than the pulse signal period whenever the pulse signal is supplied to the input terminal 57a. However, when the input terminal 57b is set at high level (to be referred to as logic "1" hereinafter), the gate signal generating time control circuit 5 does not generate the output signal.

Figure 5:
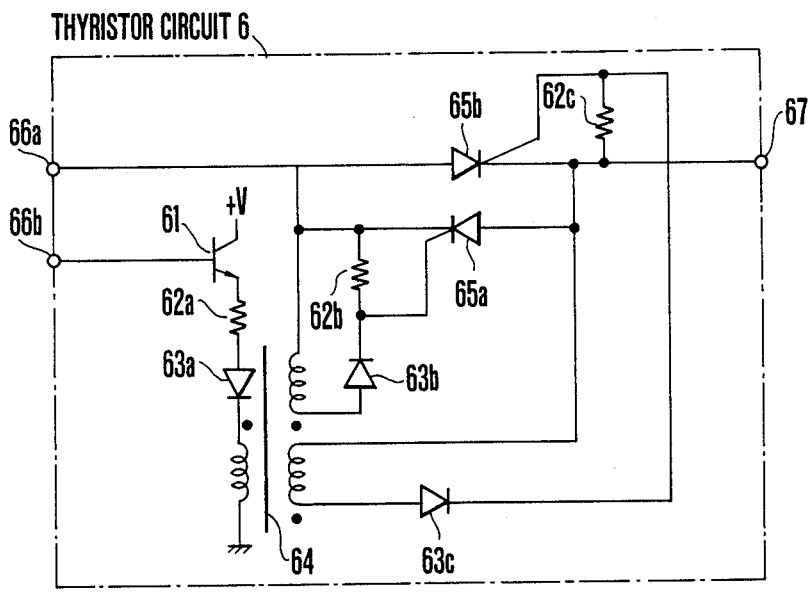
FIG. 5 is a circuit diagram showing a detailed arrangement of a thyristor circuit shown in FIG. 1.

As shown in FIG. 5, the thyristor circuit 6 comprises a transistor 61, resistors 62a and 62b, diodes 63a to 63c, a pulse transformer 64, thyristors 65a and 65b, input terminals 66a and 66b, and an output terminal 67.

Figure 6:
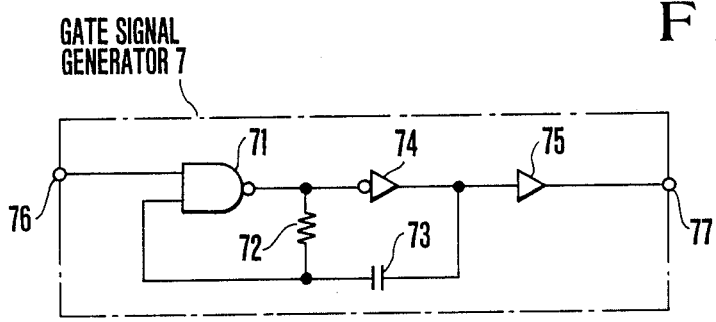
FIG. 6 is a circuit diagram showing a detailed arrangement of a gate signal generator shown in FIG. 1.

As shown in FIG. 6, the gate signal generator 7 comprises a NAND gate 71, a resistor 72, a capacitor 73, an inverter 74, a buffer 75, an input terminal 76, and an output terminal 77. The gate signal generator 7 generates a pulse signal having a frequency of about 20 kHz while the input signal of logic "1" is supplied thereto.

Figure 7:
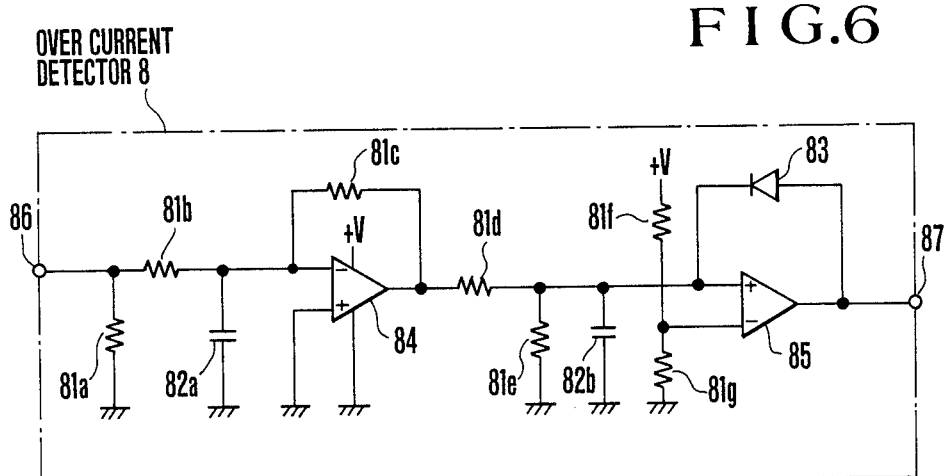
FIG. 7 is a circuit diagram showing a detailed arrangement of an over-current detector shown in FIG. 1.

As shown in FIG. 7, the over-current detector 8 comprises resistors 81a to 81g, capacitors 82a and 82b, a diode 83, differential amplifiers 84 and 85, an input terminal 86, and an output terminal 87.

As shown in FIG. 1, the heater current detector 9 comprises a transformer 91, a diode 92, a differential amplifier 93, and a reference voltage source 94. When a rectified voltage generated in response to the heater current is higher than the value of the reference voltage source 94, the heater current detector 9 generates a signal of logic "0".

The over-heat detector 10 comprises a differential amplifier 10a, a reference voltage generator 10b, and an AND gate 10c. In the normal operation, the over-heat detector 10 normally biases the relay K2. However, when a signal supplied to an input terminal 10d or a signal of logic "1" is supplied to an input terminal 10e, the over-heat detector 10 deenergizes the relay K2. For this reason, the relay K2 is deenergized when the windshield is overheated or a heater current is a minimum allowable current or less.

The sensor short-circuit detector 11 comprises a differential amplifier 11a, a reference voltage source 11b, and an AND gate 11c. In the normal state, the sensor short-circuit detector 11 biases the relay K1. The value of the reference voltage source 11b is determined such that the relay K1 is deenergized when the short circuit of the sensor, i.e., the thermistor TH is formed. In addition, in the over-heated state of the heater, the relay K is deenergized in response to a signal supplied from the over-heat detector 10 to an input terminal 11f.

The switching circuit 12 comprises an OR gate 12a and a transistor 12b, and the switching circuit 13 comprises a transistor 13a.

The operation of the AC power control circuit having the above arrangement will be described with reference to FIGS. 8A to 8H, FIGS. 9A to 9E, FIGS. 10A to 10C, and Figs. 11A and 11B.

FIGS. 8A to 8H are timing charts of the signals generated in the apparatus excluding the heater current turn on time control circuit 4 in order to readily understand the operation of the apparatus. FIGS. 9A to 9E are timing charts of the signals generated in the apparatus including the heater current turn on time control circuit 4 so as to explain the actual operation of the apparatus.

Referring to FIG. 1, the switches S1-1, S1-2, and S1-3 are simultaneously turned on and the power circuit 2 applies a voltage +V required for normal operations to the respective circuits. During the normal operation, the relay K1 is kept energized. In this state, an AC current (FIG. 8A) supplied from an input terminal IN and the filter circuit 1 is supplied to the zero level detector 3. As shown in FIG. 2, in the zero level detector 3, a Zener diode 33c is inserted in series with a base circuit of the transistor 34. The DC voltage +V is applied to the transistor 34. For this reason, if the Zener diode 33c is short-circuited, an operation start level is given as +V, as shown in FIG. 8A, under an assumption that the DC voltage +V is applied to the transistor. When the AC level is lower than the operation start level, the transistor 34 is turned on. Assuming that the Zener diode 33c is effectively operated and that its breakdown voltage is equal to the DC voltage +V applied to the transistor 34, the transistor 34 is turned on upon a decrease in level of the AC voltage by V from the operation start level +V. In this case, the transistor 34 generates a signal shown in FIG. 8B. In other words, the transistor 34 is turned on and then turned off in the next zero level time.

In the above description, a reverse-biased voltage in the base-emitter path of the transistor 34 is assumed to be zero. However, this value is actually about 0.7 V. This level cannot be eliminated as the operation start level of the transistor 34. However, by properly setting the DC voltage V and the breakdown voltage of the Zener diode 33c, the operation start level of the circuit as a whole can be adjusted to be zero level.

Zero level detection can be performed by inserting the zero level shift Zener diode 33c for cancelling the DC voltage voltage is inserted to set the operation start level of the transistor 34 to be zero although the transistor 34 is applied with the DC bias voltage in the operating direction. The voltage (FIG. 8B) generated across the resistor 32c is differentiated by the capacitor 35 and the resistor 32d, thereby producing a signal shown in FIG. 8C. This signal is clamped by the diode 33b, and the clamped signal is inverted by the inverter 36. The output from the inverter 36 appears as a pulse (FIG. 8D) at the output terminal 31b.

The pulse output from the output terminal 31b of the zero level detector 3 is supplied to one input terminal of the gate signal generating time control circuit 5 shown in FIG. 4. A control signal which is alternately set at logic "1" and logic "0" is supplied from the heater current turn on control circuit 4 to the other input terminal of the gate signal generating time control circuit 5. For descriptive convenience, a signal of logic "0" is assumed to be input to the other input terminal of the gate signal generating time control circuit 5. When a signal of logic "1" is input to a terminal 56a of the timer 56, the timer 56 generates a pulse at the trailing edge of the pulse supplied to a terminal 56b. In this case, the pulse has a time constant determined by the resistor 51b and the capacitor 55. The time constant is set to be a time between the start of one period of the AC signal shown in FIG. 8A and a time sufficiently before the end of one period but in the second half of one period. Whenever a pulse shown in FIG. 8D is supplied to the input terminal 57a, a pulse (FIG. 8F) having a signal duration T determined by the resistor 51b and the capacitor 55 appears at the output terminal 58. However, when the signal supplied to the input terminal 57b is inverted from logic "0" to logic "1", as shown in FIG. 8E, the pulse signal supplied to the input terminal 57a becomes invalid.

The pulse output from the output terminal 58 of the gate signal generating time control circuit 5 is supplied to the input terminal 76 of the gate signal generator 7. As shown in FIG. 8G, the gate signal generator 7 generates an RF gate signal whose width is determined by the resistor 72 and the capacitor 73 while the signal of logic "1" is being supplied to the input terminal 76. The gate signal is supplied from the output terminal 77 to an input terminal 66b of the thyristor circuit 6. In the thyristor circuit 6, thyristors 65a and 65b are connected in parallel with each other in a reverse-biased manner, as shown in FIG. 5. One thyristor is turned on in response to the positive half-wave cycle of the AC waveform. In general, when a forward-biased voltage is applied to the anode of a thyristor, the thyristor is turned on upon application of a gate signal thereto for a short period of time. However, if the operating conditions are severe, the thyristor is not always turned on. If good operating conditions are required, economical advantages cannot be obtained. According to the present invention, the gate signal is repeatedly supplied to the thyristor even under severe operating conditions. Therefore, the thyristor can be properly turned on. More specifically, in the AC power control apparatus in this embodiment, a gate signal having a frequency of about 20 kHz is generated and supplied to the thyristor, and the thyristor can be properly operated.

The ON thyristor is turned off by inverting the polarity of the power source voltage applied to the anode-cathode path. For this reason, the thyristor which has been turned on in response to the positive half wave is turned off in response to the negative half wave of the AC waveform. As shown in FIG. 5, when the thyristors are connected in parallel with each other in a reverse-biased manner and the RF gate signal is continuously supplied even during the negative half-wave cycle of the AC waveform, the thyristor which has been kept off during the positive half-wave cycle is turned on during the negative half-wave cycle of the AC waveform. If the gate signal is disabled at a proper moment during the negative half-wave cycle of the AC waveform, the thyristor which has been turned on upon changing from the negative half wave to the positive half wave is turned off.

In order to readily understand the operation of the thyristors, the thyristor is assumed to be turned on from the positive half wave. However, as shown in FIG. 8H, in the AC power control apparatus of this embodiment, the thyristor is actually turned on from the negative half wave. Since the gate signal is continuously supplied after time t1, i.e., time at which the negative half wave is changed to the positive half wave, the thyristor which has been kept off during the negative half-wave cycle is turned on in response to the positive half wave, so that the positive half wave is output. The gate signal is disabled at time t2. However, the thyristor which is kept on until time t3, i.e., during the positive half-wave cycle of the power source waveform, is kept on. At time t3, the positive half wave is changed to the negative half wave, the thyristor which has been kept on during the positive half-wave cycle is turned off. At time t3, the gate signal is enabled again so that the thyristor which has been kept off during the positive half-wave cycle is turned on. An output having a negative half wave is output following the positive half wave at the output terminal 67 of the thyristor circuit 6, as shown in FIG. 8H. In this manner, when the gate signal is generated at the zero-cross point of the AC waveform from one direction to the other direction, i.e., from the positive direction to the negative direction, the AC waveform can be continuously output.

The gate signal is disabled at time t4. However, the thyristor which has kept on until time t4 is kept on even if the gate signal is disabled. When the polarity of the AC waveform is changed at time t5, the thyristor which has been kept on is turned off at this moment. As shown in FIG. 8G, since the trigger signal is not supplied at time t4 and thereafter, the thyristor circuit 6 does not generate an output signal at time t5 and thereafter.

The operation of the heater current turn on time control circuit 4 will be described below. This circuit is arranged as shown in FIG. 3. The timer 41 generates a signal having a voltage which is linearly increased upon energization of the apparatus and saturated within about 3 minutes, as shown in FIG. 9A. The oscillator 43 generates a saw-toothed wave signal having a frequency of about 8 Hz, as shown in FIG. 9B. The differential amplifier 47c generates a signal shown in FIG. 9C which is logic "0" when the level of the signal generated from the timer 41 is larger than that of the saw-toothed wave signal output from the oscillator 43. The signal generated from the differential amplifier 47C is supplied from the output terminal 49 to the input terminal 57b of the gate signal generating time control circuit 5 through one input terminal of the OR gate 14. The other input terminal of the OR gate 14 receives an output signal from the over-current detector 8. When an over-current is not supplied, the output signal from the detector 8 is set at logic "0". The output signal from the OR gate 14 is determined by the output signal level of the heater current turn on time control circuit 4. A signal shown in FIG. 9D is input to the input terminal 56a of the timer 56 in the gate signal generating time control circuit 5. Since the frequency of the AC power source is about 400 Hz, the period of the saw-toothed wave is 50 times the period of the AC power source voltage. One period of the saw-toothed wave corresponds to 50 cycles of the waveform of the AC power source voltage. While the signal shown in FIG. 9D is kept at logic "1", the gate signal is supplied to the thyristor circuit 6. Within about three minutes upon energization of the apparatus, the thyristor circuit 6 is intermittently turned on. During the ON operation of the thyristor circuit 6, the ON period is prolonged when time elapses. When the timer output voltage shown in FIG. 9A is gradually saturated, the thyristor circuit 6 is kept on. FIG. 9E shows an AC waveform output from the thyristor circuit 6. As is apparent from FIG. 9E, the number of cycles included in AC waveform during the output duration is increased when time elapses.

The above description has been made when a change in glass temperature is not taken into consideration. In practice, the thermistor TH mounted on the windshield exhibits a resistance corresponding to a glass temperature. Upon energization of the heater H, the glass temperature is low and the resistance of the thermistor TH is also low. A voltage at the input terminal 48a of the heater current turn on control circuit 4 is changed in accordance with a change in resistance of the thermistor TH. A voltage level at the noninverting input terminal of the differential amplifier 47a in the amplifier 40 is higher than that at the inverting input terminal thereof. The amplifier 40 generates a signal of logic "1", i.e., a signal for heating the heater H. However, as described above, upon energization of the heater H, the output voltage from the timer 41 is gradually increased, and the output level of the differential amplifier 47b is lower than that of the differential amplifier 47a. The output level of the differential amplifier 47b is clamped through the diode 46b. The clamped signal is supplied to the inverting input terminal of the differential amplifier 47c. For this reason, at the time when the power switches are turned on, the factor for determining the heater energization time is not a glass temperature but the output voltage from the timer 41. However, when the heater is heated and the glass temperature rises, the resistance of the thermistor TH is increased. The voltage applied to the inverting input terminal of the differential amplifier 47a is also increased. The output level of the differential amplifier 47a is thus decreased. When the output level of the differential amplifier 47a is lower than the output level of the differential amplifier 47b, the diode 46b is reverse-biased. The signal supplied to the inverting input terminal of the differential amplifier 47c is controlled by only the output signal from the differential amplifier 47a. In this state, the glass temperature is controlled to be a balanced temperature.

As shown in FIG. 1, the AC waveform output from the thyristor 6 is supplied to the voltage transformer T and is converted into a rated voltage of the heater H. The rated voltage is applied to the heater H. When intermittent energization of the heater H is to be performed using the voltage transformer, the next energization cycle is started before electromagnetic energy in the transformer disappears under the assumption that the intermittent interval is shorter than a predetermined value. When heater energization is resumed, a current having a polarity opposite to that of the previous current must be supplied thereto. Otherwise, the magnetic flux in the iron core is saturated. Therefore, an AC wave shown in FIG. 10A is supplied to the input terminal 66a of the thyristor circuit 6. When the AC waveform is intermittently controlled, the output signal (FIG. 10B) from the output terminal 67 is generated such that the negative half wave must appear first when energization is ended with the positive half wave. For this purpose, the gate signal shown in FIG. 10C is generated when the waveform (FIG. 10A) from the input terminal 66b of the thyristor circuit 6 is changed from the positive half wave to the negative half wave. The gate signal is disabled before the AC waveform is changed from the negative half wave to the positive half wave but prior to the end of this positive half wave. The disabling timing of the gate signal is selected such that the thyristor is accurately turned off when the positive half wave is changed into the negative half wave.

With the above arrangement, as shown in FIGS. 10A to 10C, turn on control or energization control is performed in units of AC waveform periods. The energization time is gradually prolonged after energization of the heater. When the zero-cross point of the AC waveform appears, as shown in FIG. 10B, the heater is turned on. Energization of the heater is stopped when the zero-cross point of the AC waveform having the same polarity as that of the above-mentioned energization. This control continues until the glass temperature reaches a predetermined temperature. When the glass temperature reaches the predetermined temperature and is changed in accordance with a change in atmospheric temperature, control is started to set the glass temperature to the predetermined temperature.

As described above, the AC waveform is controlled in units of AC waveform periods, the energization period of the AC waveform is determined according to control factors. Therefore, soft start/stop control can be achieved, and temperature control satisfying the external conditions can be performed.

The thyristor is applied with trigger signal which is enabled at the start of one period of the AC waveform and disabled in the second half of one period thereof sufficiently prior to the end of one period. The thyristor can be turned on at the zero level of the AC waveform, and therefore noise is not generated. In addition, the trigger signal comprises an RF signal having a frequency of about 20 kHz during generation of the trigger signal, and the thyristor is repeatedly turned on in response to the trigger signal. As a result, the thyristor can be properly turned on.

The AC waveform controlled by the thyristor circuit 6 is transformed into the rated voltage of the heater H by the voltage transformer T. Part of the winding of the transformer T is constituted by the transformer 91 in the heater current detector 9. For this reason, the current supplied to the heater H is picked up by the transformer 91 and is rectified by the diode 92. The rectified current is supplied to the inverting input terminal of the differential amplifier 93. For this reason, when a current is supplied to the heater, an output from the differential amplifier 93 and an output from the gate signal generating time control circuit 5 are ANDed by the AND gate 15, and an AND output is supplied to turn on the operation indicator lamp L1.

The current output from the thyristor 6 is supplied to the input terminal 86 of the over-current detector 8 through part of the winding of the voltage transformer T. This current is supplied to the resistor 81, as shown in FIG. 7, to cause generation of an AC voltage (FIG. 11A) having a magnitude corresponding to that of the current supplied through the thyristor. This AC voltage is supplied to the inverting input terminal of the differential amplifier 84 shown in FIG. 7. A bias V/2 is applied to the noninverting input terminal of the differential amplifier 84, its output is supposed to be an inverted sinusoidal wave of the input which has an amplitude V/2. However, if so, the input waveform must be rectified and a complicated circuit arrangement is required. Assume that an IC (e.g., LM2904) whose operation is assured at a voltage of −0.3 V or higher is used as the differential amplifier 84, that the noninverting input terminal of the differential amplifier 84 is grounded, and that a signal having an amplitude up to −0.6 V is input to the inverting input terminal of the circuit of FIG. 7. Under these assumptions, a positive half wave having an amplitude V is output, as shown in FIG. 11C. The differential amplifier 84 simultaneously perform rectification and amplification, thus providing an economical advantage.

An output from the differential amplifier 84 is smoothed by the resistor 81d and the capacitor 82b. When a smoothed output is higher than the reference potential determined by resistors 81f and 81g, the differential amplifier 85 generates an output signal of logic "1". This signal of logic "1" is supplied to the input terminal 57b of the gate signal generating time control circuit 5 through the output terminal 87 and the OR gate 14 of FIG. 1. The gate signal generating time control circuit 5 does not generate an output signal in response to the signal of logic "1" supplied to the input terminal 57b. Therefore, when an over-current is detected, the gate signal is not supplied to the thyristor circuit 6, and the current supplied to the thyristors is cut off.

In this manner, one input terminal of the differential amplifier is fixed to zero level, and the AC signal is supplied to the other input terminal thereof, thereby constituting a simple level detector which have both the rectification and amplification functions.

When the windshield is overheated due to some reason, the resistance of the thermistor TH is increased. Since a current is supplied from the heater current turn on control circuit 4 to the thermistor TH, the voltage applied to the noninverting input terminal of the differential amplifier 10a in the over-heat detector 10 is increased upon over-heating of the windshield. When this voltage is higher than the value of the reference voltage source 10b, the differential amplifier 10a generates an output signal of logic "1". This signal is output through the AND gate 10c, and thus the relay K2 is deenergized. Since the relay K2 is normally biased, as previously mentioned, the contact K2 of the relay K2 is set in the illustrated position. In this state, the over-heat indicator lamp L2 is turned on. However, when an over-current is not supplied to the heater H, the relay K2 is not deenergized.

As described above, the sensor short-circuit circuit 11 biases the relay K1 when the thermistor TH is set in the normal condition. If a short circuit of the thermistor TH is formed due to some reason, the voltage applied to the inverting input terminal of the differential amplifier 11a in the sensor short-circuit detector 11 is higher than that of the noninverting input terminal thereof, the differential amplifier 11a generates a signal of logic "1". For this reason, the AND gate does not generate an output to deenergize the relay K1. The contact k1 of the relay K1 is opened, and the AC power supplied to the thyristor circuit 6 is cut off. Moreover, when an over-heat state is detected, the AND gate 11c does not generate an output and the AC power is cut off.

The switch S4 is designed to set a pseudo over-heat state. When the switch S4 is turned on, the transistors 12b and 13a are turned on. When the transistor 12b is turned on, an over-heat state of the windshield is simulated. When the transistor 13a is turned on, the output voltage from the timer 41 shown in FIG. 3 is saturated. For this reason, as soon as the power is supplied to the apparatus, an over-heat function can be checked whether to be normally effected.

The switch S5 is designed to set a pseudo saturation state of the output voltage from the timer 41 upon energization of the apparatus. Therefore, a temperature control state of the thermistor TH can be checked upon energization of the apparatus.

Zero level control of the AC waveform and energization control in units of AC waveform periods are performed to effectively control the energization or turn on time of the thyristor without causing noise.

What is claimed is:

1. An AC power control apparatus comprising:
   power supply means for supplying an AC current through a voltage transformer to a load;
   means for detecting a zero-cross point of an AC current waveform;
   means connected to said power supply means for changing an energization time of said load in units of periods of the AC current waveform such that the energization time of said load starts and ends at the zero-cross points of the AC current waveform, respectively, and the AC current waveform has a same polarity changing direction at the zero-cross points at which the energization time starts and ends.

2. An apparatus according to claim 1, wherein said means for changing the energization time comprises means for determining the number of periods of the AC current waveform to be included in the energization time of said load in accordance with a temperature of said load.

3. An apparatus according to claim 1, wherein said means for changing the energization time comprises trigger means for generating a trigger signal which is enabled at a start of one period of the AC current waveform and disabled in a second half of said one period sufficiently prior to an end of said one period.

4. An apparatus according to claim 3, wherein said trigger means includes a circuit for generating an RF signal during generation of the trigger signal.

5. An apparatus according to claim 1, wherein said means for changing the energization time further comprises: a current/voltage converting means for generating a detection voltage in response to a current supplied across said load; a differential amplifier means, one input terminal of which is fixed to a zero level and the other input terminal of which receives the detection voltage; and level discriminating means for generating an output signal representing an over-current when a voltage obtained by smoothing an output from said differential amplifier means exceeds a predetermined value.

6. An according to claim 1, wherein said zero-cross paint level detecting means comprises: a switching element for receiving a DC bias voltage increased in an operating direction; and level shift means for shifting an operation start level of said switching element in a direction for cancelling the DC bias voltage, said level shift means having a level shift amount determined such that the operating start level is set to be a zero level.

7. An AC power control apparatus for controlling an energization time of a heater embedded in a glass plate and for heating the glass plate, comprising:
   a rectifying means coupled to a heater responsive to a trigger signal for controlling the energization time of the heater; and
   a trigger circuit for generating the trigger signal, the trigger signal being enabled at a start of a period of the AC waveform and disabled in a second half of the period.

8. An apparatus according to claim 7, wherein the trigger signal is an RF signal generated during generation of the trigger signal.

9. An AC power control apparatus according to claim 7, further comprising: a current/voltage converter for generating a detection voltage in accordance with a current supplied through said heater; a differential amplifier, one input terminal of which is fixed to a zero level and the other input terminal of which receives the detection voltage; and a level discriminator for generating an output signal representing an overcurrent when a voltage obtained by smooting an output from said differential amplifier exceeds a predetermined value.

10. An AC power control apparatus according to claim 7 whose energization time is controlled by an on/off timing of a switching element, further comprising: a switching element applied with a DC bias voltage increased in an operating direction; and level shift means for shifting an operation start level of said switching element in a direction for cancelling the DC bias voltage, said level shift means having a level shift amount determined such that the operation start level of said switching element is set to be a zero level.

* * * * *

UNITED STATES PATENT AND TRADEMARK OFFICE
CERTIFICATE OF CORRECTION

PATENT NO. : 4,868,486
DATED : 09/19/89
INVENTOR(S) : Shinoda

It is certified that error in the above-identified patent and that said Letters Patent is hereby corrected as shown below:

| | |
|---|---|
| col. 03, line 15 | delete "pb" |
| col. 10, line 61 | insert --apparatus-- between "An" & "according" |
| col. 10, line 62 | delete "paint" insert --point-- |
| col. 10, line 62 | delete "level" |

Signed and Sealed this

Twenty-seventh Day of November, 1990

Attest:

HARRY F. MANBECK, JR.

*Attesting Officer*     *Commissioner of Patents and Trademarks*